INVENTOR
Herbert J. Chauffe

INVENTOR
Herbert J. Chauffe

United States Patent Office 3,448,564
Patented June 10, 1969

3,448,564
CANE HARVESTER
Herbert J. Chauffe, 250 Lousia St.,
Jeanerette, La. 70544
Filed May 27, 1966, Ser. No. 553,460
Int. Cl. A01d 45/10, 57/22, 75/02
U.S. Cl. 56—17                        3 Claims

ABSTRACT OF THE DISCLOSURE

The present invention is directed to a sugar cane harvester having a mobile main frame adapted to travel through a sugar cane field. A supplemental frame carrying a topper and gathering means is pivotally connected to be adjustable as to height relative to the main frame and this supplemental frame also carries with it sticker chain and pressure bar means a portion of which is located rearwardly of the harvester intake and positioned at an obtuse angle to the path of harvester travel to receive the cane and move it laterally of the harvester for deposit on a heap row on the side of the harvester remote from the mobile machine frame without the sugar cane passing through the harvester.

---

The present invention relates to cane harvester which has definite and substantial advantages over those now being used in the Louisiana cane fields in the following particulars:

(1) It can be produced and sold for less money.
(2) It will cost less to maintain.
(3) It is shorter and more maneuverable.
(4) It is lighter and, therefore, less likely to bog or to cut deep ruts.
(5) It is lower and shorter and can be stored in a small space.
(6) The improved sticker chain arrangement eliminates chokes by removing the right angle turn from the direction of travel of the harvester transversely to one side thereof.

At the present time there are three basic sugar cane harvesters now in use in Louisiana.

(A) One type is that manufactured by Thomson Machinery Company of Thibodaux, La., which is generally illustrated and described in United States Patent 2,427,-313, dated Sept. 9, 1947, in which a cane piler is incorporated in the harvester. This machine straddles the row of cane being cut. The frame of this machine is basically of a very high heavy arch construction that conveys the topped, but still standing, cane (as much as 8'6" tall) completely through the center of the machine and thence to a piling conveyor which automatically deposits the canes upon a heap row. This harvester will hereinafter be referred to as the Thomson harvester.

(B) Another type of harvester is that disclosed in United States Patent 2,669,829, granted Feb. 23, 1954, entitled "Cane Harvesting and Piling Machine." This harvester is of a type basically built upon a four wheel tractor. The harvester is suspended behind the tractor. The gearing and controls are reversed so that the tractor operates while traveling in a direction reverse to that originally intended. This type harvester uses its own power unit for gathering, topping and conveying the cane. Since the bulky harvesting unit must be suspended back of the tractor, the front end (radiator end) of the tractor, which becomes the rear end of the harvesting unit, must be heavily counterweighted simply to keep the small wheels on the ground. This makes for a very unstable machine which is easily damaged. This harvester will hereinafter be referred to as the Thornton harvester.

(C) A third type of harvester is that illustrated and described in United States Patent 3,095,679, granted July 2, 1963, entitled "Cane Conveyor Assembly for Harvesters," which patent discloses a four-wheel, self-propelled unit. Its adjustable gathering and topping system is supported in front of the smaller front wheels. The axle and king pins for these front wheels are supported by a tall arch which allows the topped but still standing cane to be conveyed into the center of the machine where it is severed from its roots and then conveyed to the right side through another heavy arch behind the smaller front wheel and in front of the large rear drive wheel. Here it enters a piling conveyor. This type harvester will hereinafter be referred to as the J & L Harvester.

Of the three harvesters, the Thornton harvester has proven itself as the easiest and least expensive to maintain, but has lost favor because with the purchase of a tractor on which to mount it, the total outlay became expensive.

The present invention incorporates an improved Thornton type harvester into a simple, compact, stable, three-wheel, self-propelled harvester.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
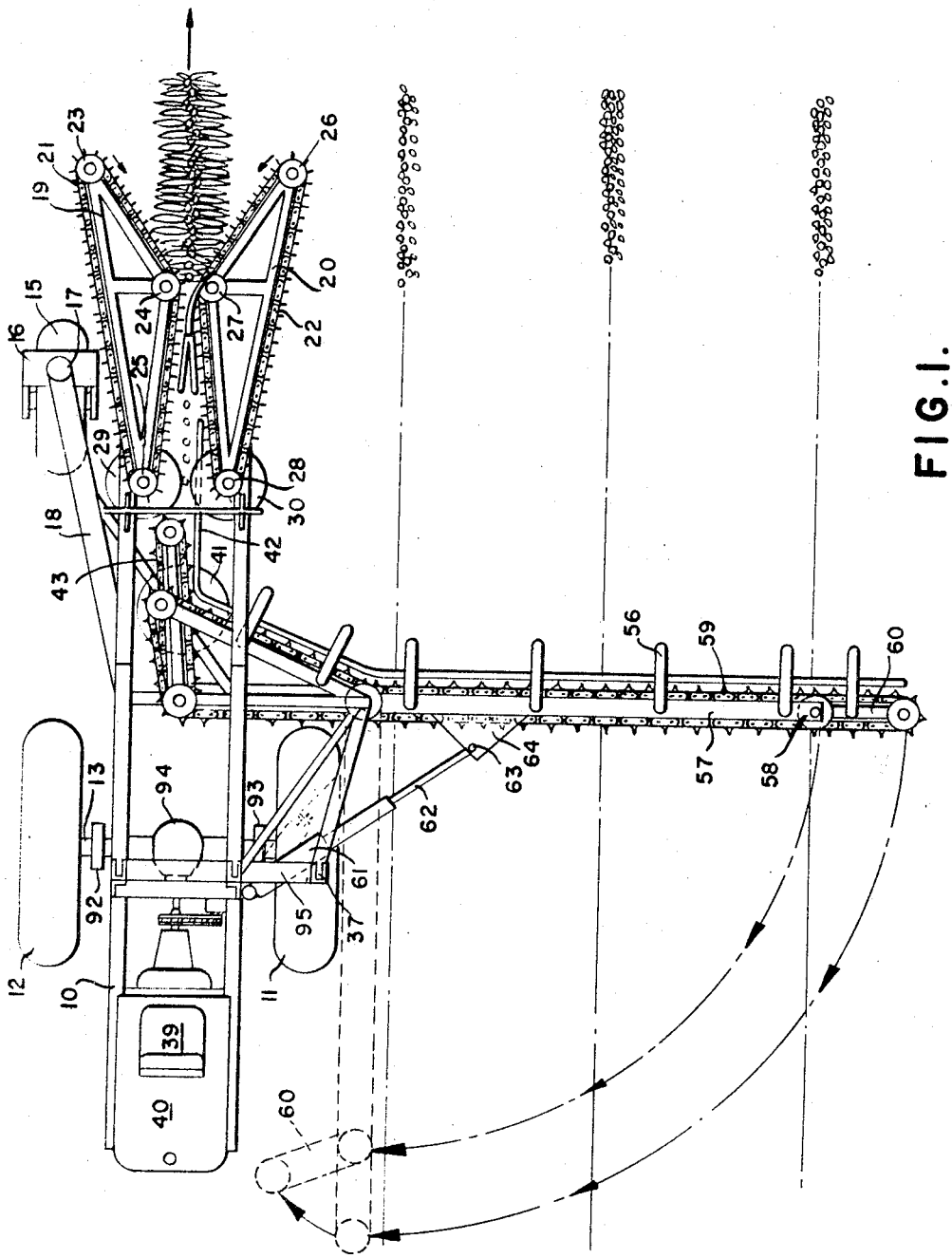
FIGURE 1 is a top plan view of a cane harvester constructed in accordance with the present invention.

Referring more particularly to the drawing, 10 designates a frame supported at its rear by two large wheels 11 and 12 which are arranged to support over two-thirds of the weight of the harvester. The wheels are mounted to an axle 13 journalled in appropriate bearings 14 dependent from the frame 10, as indicated in FIGURE 2.

Figure 2:
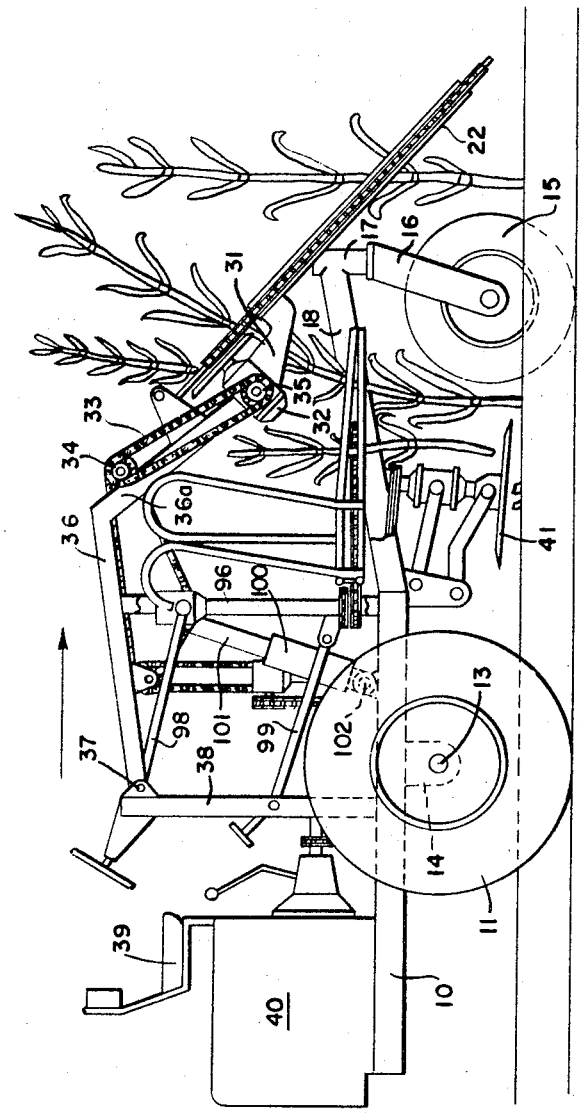
FIGURE 2 is a side elevational view of the same.
Figure 3:
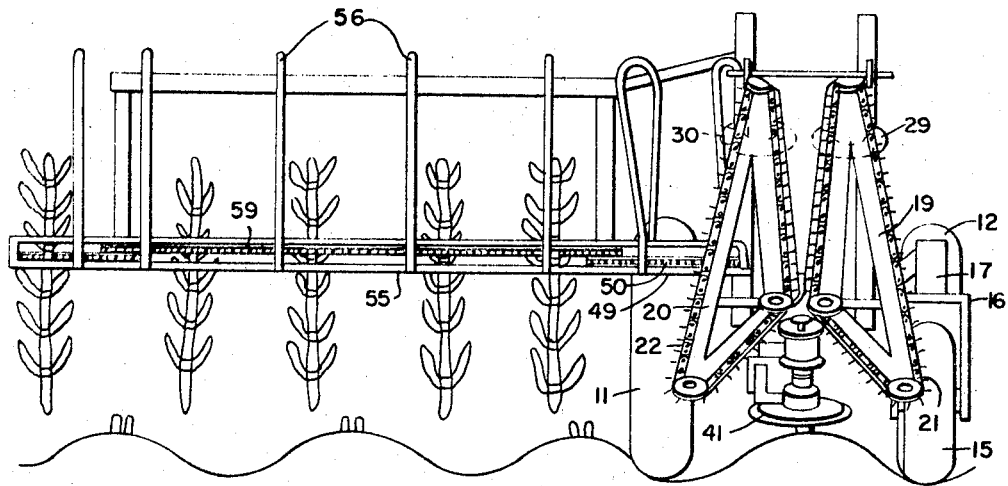
FIGURE 3 is a front elevational view of the harvester, with the piler extended.
Figure 4:
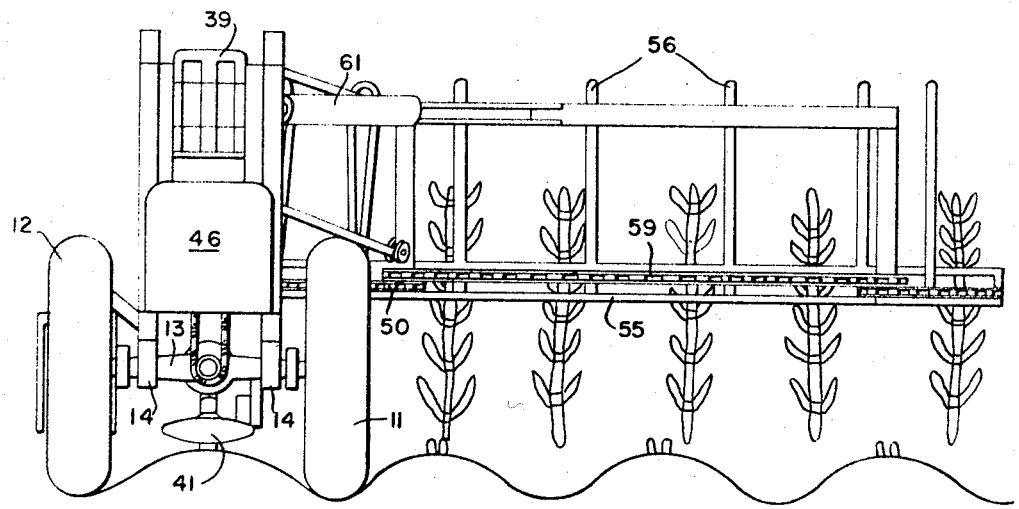
FIGURE 4 is a rear elevational view of FIGURE 3.

The only other ground support is through a front steering wheel 15 having a fork 16 swivelly mounted in a bearing 17, as shown in FIGURES 1 and 2, which fork is carried by a supporting arm 18 projecting forwardly and diagonally from one of the side members of the main frame 10. This front wheel 15 serves to support the gathering arms 19 and 20 and eliminates the need of extra counterweights to the rear of the drive axle, the weight of the engine being sufficient.

The gathering arms support movable gathering chains 21 and 22, having the usual projections and running around sprockets 23, 24 and 25 for the chain 21 and sprockets 26 and 27 and 28 for the chain 22.

As shown in FIGURE 2, the gathering frames are supported at the front of the harvester at an inclination sloping downwarly and forwardly where the chains form wide mouths, as indicated in FIGURE 1, so as to guide the canes or the stalks into the narrow throat of the harvester, the entrance to which is defined by the intermediate sprockets 24, 27.

Associated with the rear sprockets 25, 28 are the rotary topper knives for severing the tops of the canes.

The gathering arms 19 and 20 are carried by brackets 31 (FIGURE 2) which also support the gear boxes 32 housing the gears connected to drive the sprockets 25, 28 and rotary topper knives 29, 30. One or more chains 33 running over sprockets 34 and 35 drive the toppers and the gathering chains. The brackets 31 supporting the toppers, gathering chains, gear boxes 32 and chains 33 are supported by structural members 36 forming a supplemental frame which may be pivoted at 37 to one or more upright members 38 on the frame 10 adjacent the operator's seat 39 which may be disposed over the main frame in the vicinity of a motor 40 installed on the frame and connected, as hereinafter described, to drive the ground wheels 11 and 12 and the various moving parts of the machine.

Figure 5:
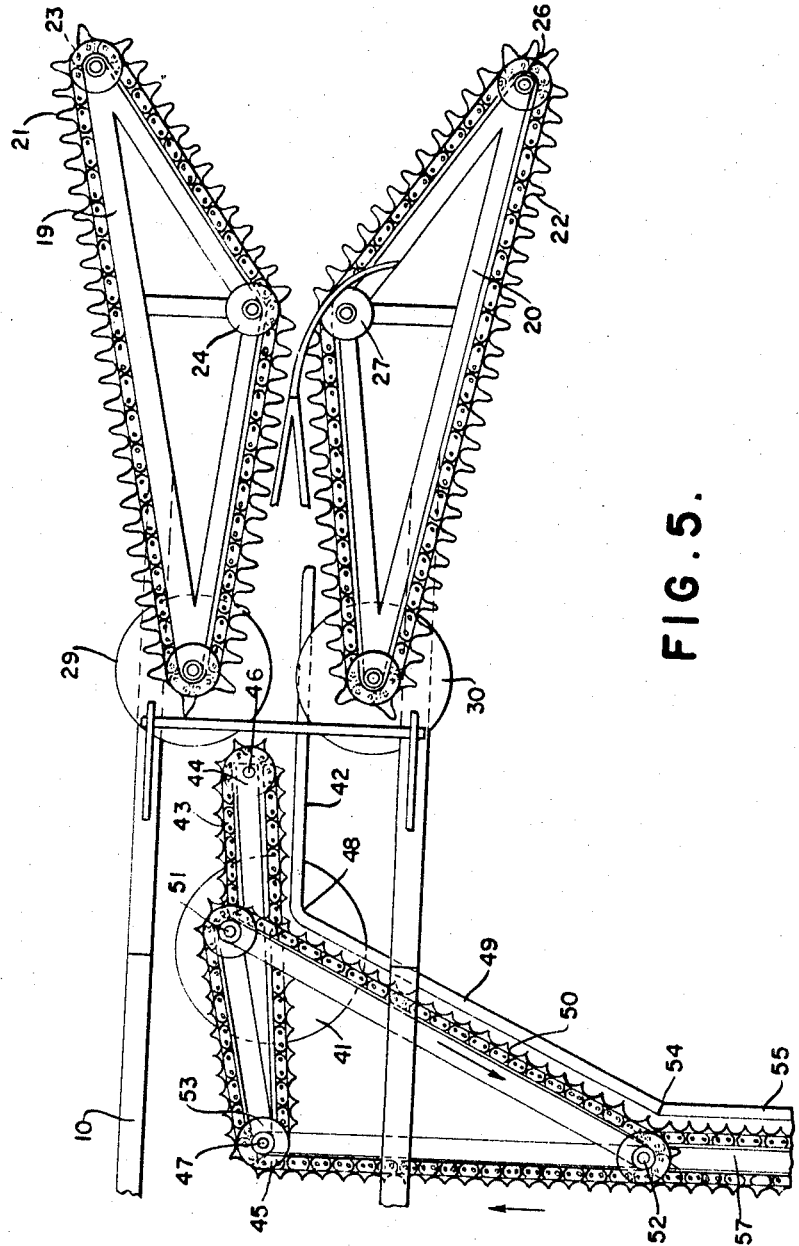
FIGURE 5 is a plan view showing the improved preferred forms and arrangements of gathering, and sticker chain and pressure bar means for supplying cane to the piler chains.

Rearwardly of the toppers and at a low elevation is a rotary stubble knife 41 disposed in the path of the cane stalks immediately after the same are topped by the toppers 29, 30 and just after the intermediate portions of the canes have been caught between a pressure bar 42 and a sticker chain 43, shown more partciularly in FIGURES 1 and 5. This sticker chain 43 runs around sprockets 44 and 45 on shafts 46 and 47, respectively. The chain 43 runs generally in a longitudinal direction relative to the harvester frame and the direction of movement of the same down a row of cane.

As shown to best advantage in FIGURE 5, the pressure bar turns through an obstuse angle at the point 48 and with the continuing arm 49 of this pressure bar, which extends in a laterally outward direction from the frame 10, there cooperates a second sticker chain 50 running around sprockets 51, 52 and a sprocket 53 on the shaft 47. The chain 50 moves in the direction of the arrow and advances the stalks laterally outward of the harvester on the diagonal section 49 of the pressure bar up to a point 54 where the bar 49 is again bent in an obtuse angle and thereafter continues in a pressure bar 55.

The sticker chains 43 and 50 cooperate with their adjacently spaced pressure bars 42 and 49 respectively to eliminate the sharp right angle turn shown in the Pugh harvester shown in U.S. Patent 2,669,829 which has heretofore resulted in chokes requiring frequent stopping of the harvester. The sticker chains 43 and 50 are driven from the same shaft 47, the drive sprockets for each chain being mounted on shaft 47 one above the other.

The bar 55 is in a separate piece from the bar 49 and is carried by yokes 56 from the frame member or piler arm 57 which carries the sprockets 52 and 58 (FIGURE 1) about which the piler sticker chain section 59 extends. Thus the piler arms 57 may rotate about 52 as a center in moving from the projected position of FIGURE 1 to the chain line position substantially parallel to the frame 10 of the harvester.

This is the collapsed position of the piler arm 57 when the piler is not in use. Also the piler may have an extension bar or frame 60 turning about the center of rotation of the sprocket 58 in order to permit this tip section 60 to move to the dotted line position in FIGURE 1 whereby to shorten the over-all length of the piler mechanism when the harvester is being moved to and from the field.

A hydraulic ram 61 pivoted or otherwise mounted to the frame 10 may be used to move the piler frame 57 into and out of an operative position in a swinging movement around the center 52. This ram contains a plunger rod 62 pivoted at 63 to a web 64 attached to the frame 57.

Figure 6:
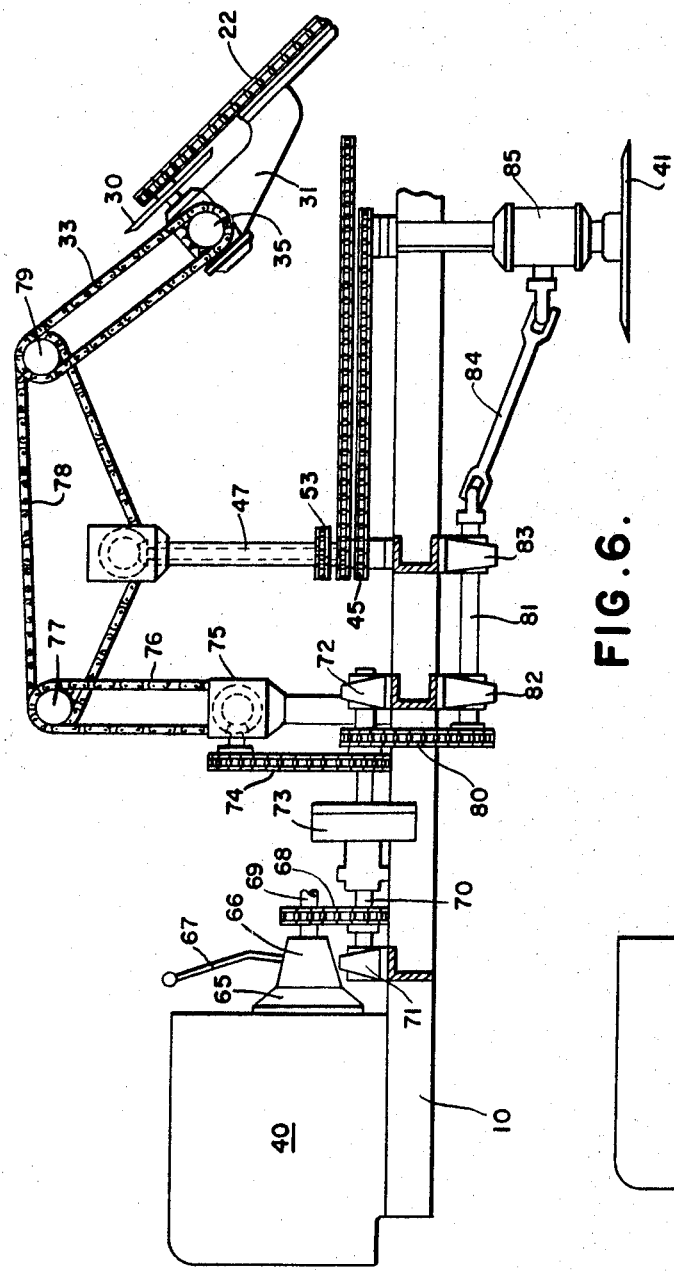
FIGURE 6 is a side elevational view of a form of transmission and drive mechanism for the various chains and for the topping knives and the stubble knife.

Referring more particularly to FIGURE 6, incorporated wth the engine is a clutch 65 and a four-speed transmission 66 under the control of a stick 67. A chain drive 68 connects the transmission shaft 69 with a clutch shaft 70 journalled in pillow blocks 71 and 72 mounted on the frame 10. Between the blocks is a clutch 73.

The shaft is connected by chain and sprocket or other drive 74 to a bevel gear box 75 driving a chain 76 and its counter shaft 77, which through chain and sprocket gearing 78 drives another counter shaft 79 coupled to the chain 33 for driving the toppers 29 and 30.

The clutch shaft 70 is also coupled to a chain and sprocket drive 80 which drives a counter shaft 81 mounted in bearings 82 and 83 on the main frame, this shaft being coupled through a universal coupling 84 to the bevel gear box 85 of the rotary stubble knife 41.

Figure 7:
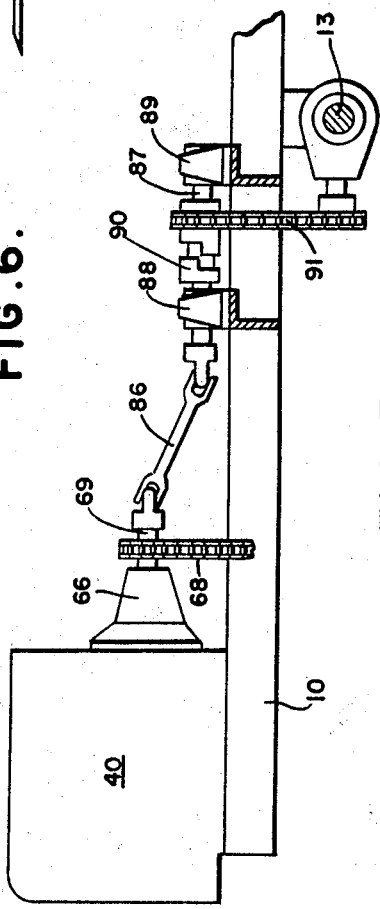
FIGURE 7 is a side elevational view of a form of harvester drive for propelling the harvester through the field.

Referring more particularly to FIGURE 7, the transmission shaft 69 may be coupled through a universal joint drive shaft 86 to a shaft 87 mounted in bearings or pillow blocks 88 and 89 having a jaw or other clutch 90 by which to engage a chain and sprocket drive 91 to the axle 13 of the main ground wheels 11 and 12. Individual brakes 92 and 93 (FIGURE 1) on the two shaft sections at opposite sides of the differential 94 may be arrested in motion to assist in steering the vehicle.

The harvester may be steered by applying the brakes differentially of the two drive wheels added, or, by a hydraulic cylinder or the like connected to the front wheel 15 or by both to permit the harvester coming out of cane rows onto the head land to be turned and to re-enter the cane square in a minimum radius turn, which permits the cane farmer to have a greater area of cane square in cane and a minimum of head land.

It will be noted, particularly from FIGURE 5, that the sprockets 51 and 52 are idler sprockets and the sprocket 53 is the drive sprocket. It will also be noted that the sprockets 51, 52 and 53 are in a triangular arrangement. The directions given the sticker chains 43 and 50 and the obtuse angle bends 48 and 54 in the pressure bars reduce the abrupt change in direction from the 90° corner of the Thomson piler and this in turn reduces the amount of breakage to the cane stalks being conveyed.

Referring more particularly to FIGURE 1, and also to FIGURE 2, the upright members 38 which are affixed to the main frame are preferably connected for stability to a top cross bar 95, and the structural members 36 are pivoted at 37 to the uprights 38. To such structural members 36 are affixed dependent bars 96 connected at intermediate points by a cross-piece. An upper pair of links 98 are pivoted to the pivots 37 and to intermediate portions of the dependent bars 96, for instance, at the locations of the cross-piece 97. A lower pair of links 99 are pivoted to lower portions of the uprights 38 and lower portions of the dependent bars 96 to provide parallel linkages.

The linkages, together with the structural members 36 and 36ª and brackets 31, constitute a supplemental frame carrying the gathering arms 19 and 20 including the toppers 29, 30 by which the toppers and gathering arms are subject to vertical adjustment by and under the clear view of the operator occupying the seat 39 who may vary the height at which the canes are being cut by the observable golden line of maturity of the cane, thus conveniently serving an economic function in that the full length of mature cane may be saved for increased sucrose content extraction at the sugar house or mill.

The parallel linkages stabilize and guide the adjusting movements of the supplemental frame and the corresponding raising and lowering movements of the gathering arms and toppers.

Suitable means are provided for accomplishing these adjusting movements in the form of hydraulic or pneumatic mechanism comprising a hydraulic cylinder 100 pivoted at 102 to the main frame 10 and having a movable ram or plunger rod 101 having an sleeve fit about the preferably round cross-piece 97. Control of hydraulic fluid to and from the cylinder 100 by the operator will be according to well known mechanism.

What is claimed is:
1. A cane harvester comprising
   (a) a mobile main frame adapted to travel through the square,
   (b) cane topping means,
   (c) cane gathering means,
   (d) a supplemental frame carrying said topping and gathering means and adjustable as to height relatively to the main frame, and

(e) sticker chain and pressure bar means carried by said supplemental frame and being elevatable therewith, (f) said sticker chain and pressure bar means having a narrow receiving throat positioned to receive cane from the gathering means and to cause the cane to travel in substantially the same plane along a path rearwardly in the line of harvester travel, a portion of said sticker chain and pressure means being positioned rearwardly of said throat at an obtuse angle to the path of harvester travel to receive the cane and move it laterally of the harvester for deposit on a heap row on the side of the harvester remote from said mobile main frame without passing through the harvester.

2. A cane harvester as claimed in claim 1 in which said supplemental frame further comprises (j) upright members on said main frame, (k) dependent bars on the structural members spaced forwardly of the upright members, (l) steadying linkages between the upright members and the structural members, (m) a cross member between the dependent bars spaced below the structural members, said adjusting means comprising (n) a hydraulic cylinder and ram couple pivotally connected between the main frame and the cross member.

3. A cane harvester as claimed in claim 1, further comprising (g) a pair of ground wheels supporting said main frame at an intermediate point, (h) a motor on said frame connected to drive said wheels and being rearwardly thereof to balance the weight of the forward portion of the frame carrying the supplemental frame, toppers and gatherers, (i) a supporting arm extending diagonally out from and upwardly of the front portion of said frame, and (j) a steering wheel swivelly attached to said arm alongside said gathering means.

References Cited

UNITED STATES PATENTS

| | | | |
|---|---|---|---|
| 2,435,334 | 2/1948 | Wurtele | 56—59 X |
| 2,516,277 | 7/1950 | Vichie et al. | 56—17 |
| 2,974,464 | 3/1961 | Thornton | 56—17 |

LUCIE H. LAUDENSLAGER, *Primary Examiner.*

U.S. Cl. X.R.

56—59